US011991510B2

(12) United States Patent
Rothschild

(10) Patent No.: US 11,991,510 B2
(45) **Date of Patent: *May 21, 2024**

(54) SYSTEM AND METHOD FOR ADJUSTING AUDIO PARAMETERS FOR A USER

(71) Applicant: Leigh M. Rothschild, Miami, FL (US)

(72) Inventor: Leigh M. Rothschild, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,524

(22) Filed: May 30, 2023

(65) Prior Publication Data

US 2023/0308804 A1 Sep. 28, 2023

Related U.S. Application Data

(63) Continuation of application No. 16/715,874, filed on Dec. 16, 2019, now Pat. No. 11,683,645, which is a continuation of application No. 16/057,651, filed on Aug. 7, 2018, now Pat. No. 10,511,907.

(60) Provisional application No. 62/541,801, filed on Aug. 7, 2017.

(51) Int. Cl.

*H04R 3/04* (2006.01)
*G10L 25/51* (2013.01)
*H04R 25/00* (2006.01)

(52) U.S. Cl.

CPC ................ *H04R 3/04* (2013.01); *G10L 25/51* (2013.01); *H04R 25/356* (2013.01); *H04R 25/353* (2013.01); *H04R 2430/01* (2013.01)

(58) Field of Classification Search

CPC ...... H04R 3/04; H04R 25/356; H04R 25/353; H04R 2430/01; G10L 25/51
USPC ........................................................... 381/60
See application file for complete search history.

(56) References Cited

U.S. PATENT DOCUMENTS 11,188,292 B1 * 11/2021 Jenkins .................. G10L 25/18
2018/0270590 A1 * 9/2018 Rountree, Sr. ......... H04R 25/30
2018/0324516 A1 * 11/2018 Campbell ............ H04R 1/1091

* cited by examiner

*Primary Examiner* — Sean H Nguyen
(74) *Attorney, Agent, or Firm* — Dobbin IP Law, P.C.; Geoffrey E. Dobbin, Esq.

(57) ABSTRACT

A device, system, and a method for adjusting audio parameters for a user are disclosed. The method comprises performing a hearing test of the user. The hearing test comprises playing an audio and capturing an auditory response of the user towards the audio. A hearing profile of the user is generated based on one or more results of the hearing test. A playing speed of the audio is adjusted based on the hearing profile, thereby adjusting the audio parameters for the user.

8 Claims, 6 Drawing Sheets

SYSTEM AND METHOD FOR ADJUSTING AUDIO PARAMETERS FOR A USER

PRIORITY

This patent application claims the benefit and priority from issued U.S. Pat. No. 10,511,907 filed Aug. 7, 2017.

FIELD OF THE DISCLOSURE

The present disclosure is generally related to processing of audio information, and more particularly related to adjusting audio parameters for a user.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Hearing loss is one amongst the most prevalent chronic health conditions. Typically, the hearing loss is mitigated through use of hearing aids. However, each and every user may not use the hearing aids due to various reasons such as, but not limited to, cost, physical discomfort, and lack of effectiveness in some specific listening situations, societal perception, and unawareness of the hearing loss. Further, the hearing aids may not work with various headphone devices. Also, the hearing aids may not be able to modify the audio heard by each user while the user is suffering from impaired hearing.

Currently, the hearing loss is diagnosed by a medical specialist by performing hearing test. The hearing test comprises playing an audio, including various audio frequencies, on a user device for a short listening test and capturing an auditory response of the user towards the audio and various audio frequencies. The auditory response is resulted into a score and a chart for determining whether the hearing of the user is good or bad for each ear. However, the current method of the hearing test does not provide any appropriate solution to the user for overcoming hearing problems.

Further, the hearing loss is diagnosed by the medical specialist by using a tool such as audiometer in a noise-free environment. The noise-free environment IS an environment where impediments to the hearing are absent. However, the user is exposed to many environments in which acoustic noise is prevalent, such as a moving automobile or a crowded location, and thus performance may decrease dramatically in the presence of noise.

Thus, the current state of the art is costly and lacks an efficient mechanism for overcoming the hearing problems of the users. Therefore, there is a need for an improved method and system that may be cost effective and efficient.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words “comprising,” “having,” “containing,” and “including,” and other forms thereof, are intended to be equivalent in meaning and be open ended in that an item or items following anyone of these words is not meant to be an exhaustive listing of such item or items, or meant to be limited to only the listed item or items.

It must also be noted that as used herein and in the appended claims, the singular forms “a,” “an,” and “the” include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
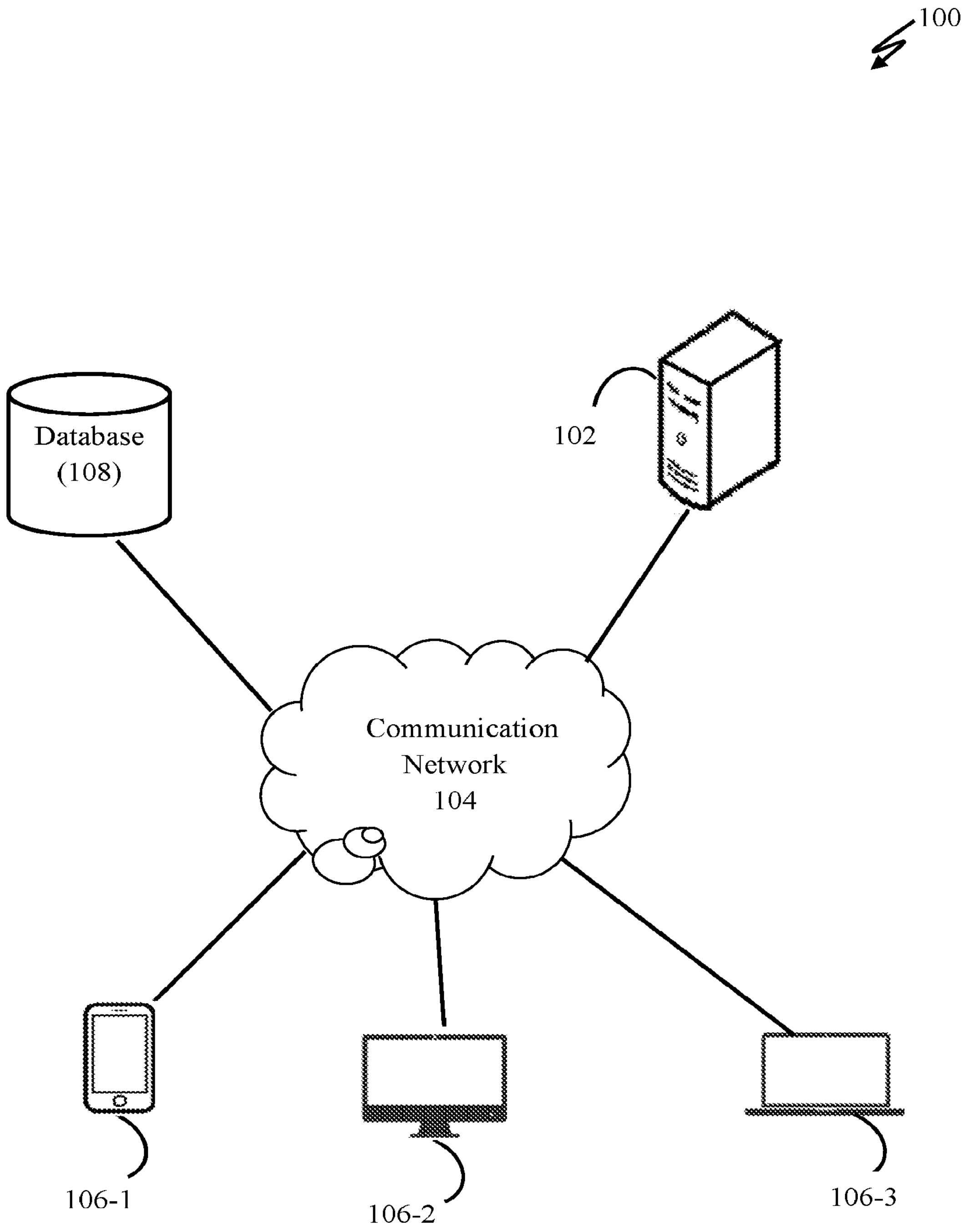
FIG. 1 illustrates a network connection diagram 100 of a system 102 for adjusting audio parameters for a user, according to an embodiment.

FIG. 1 illustrates a network connection diagram 100 of the system 102 for adjusting audio parameters for a user, according to an embodiment. The system 102 may be connected to a communication network 104. The communication network 104 may further be connected with a user device (106-1 to 106-3, hereinafter referred as 106) and a database 108 for allowing data transfer among the system 102, the user device 106, and the database 108.

The communication network 104 may be a wired and/or a wireless network. The communication network 104, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art.

The user device 106 may refer to a computing device used by the user, to perform one or more operations. In one case, an operation may correspond to selecting a particular band of frequencies. In another case, an operation may correspond to defining playback amplitudes of an audio. The audio may be a sample tone, music, or spoken words. The user device 106 may be realized through a variety of computing devices, such as a desktop, a computer server, a laptop, a personal digital assistant (PDA), a tablet computer, and the like.

The database 108 may be configured to store auditory response of the user towards the audio. In one case, the database 108 may store one or more results of a hearing test of the user. The one or more results may correspond to a hearing ability of the user. In an embodiment, the database 108 may store a hearing profile of the user. As an example, the hearing profile may correspond to a hearing adjustment profile. The hearing profile may include a spectrum of the audio divided into a plurality of audio frequency bands.

In an embodiment, the database 108 may store user defined playback amplitudes of the audio. Further, the database 108 may store historical data related to the hearing ability of the user. The historical data may include user preferences towards the audio. A single database 108 is used in present case; however different databases may also be used for storing the data.

Figure 2:
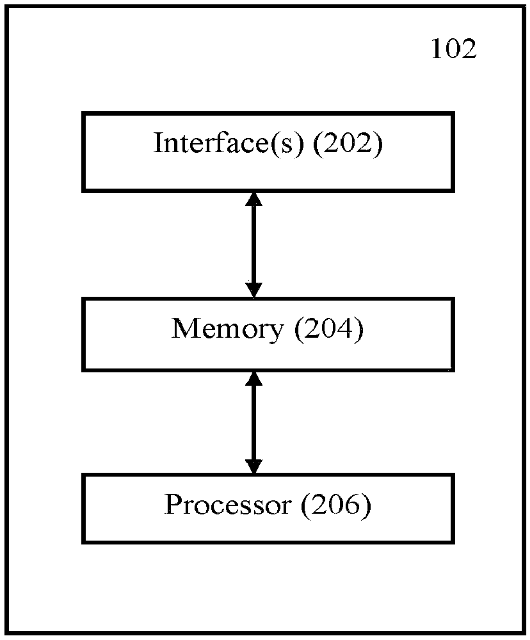
FIG. 2 illustrates a block diagram showing different components of the system 102, according to an embodiment.

In one embodiment, referring to FIG. 2, a block diagram showing different components of the system 102 is explained. The system 102 comprises interface(s) 202, a memory 204, and a processor 206. In an embodiment, the system 102 may be integrated within the user device 106. In another embodiment, the system 102 may be integrated within a separate audio device (not shown).

The interface(s) 202 may be used by the user to program the system 102. The interface(s) 202 of the system 102 may either accept an input from the user or provide an output to the user, or may perform both the actions. The interfaces 202 may either be a Command Line Interface (CLI), Graphical User Interface (GUI), or a voice interface.

The memory 204 may include, but is not limited to, fixed (hard) drives, magnetic tape, floppy diskettes, optical disks, Compact Disc Read-Only Memories (CD-ROMs), and magnetooptical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The processor 206 may execute an algorithm stored in the memory 204 for adjusting the audio parameters for the user. The processor 206 may also be configured to decode and execute any instructions received from one or more other electronic devices or server(s). The processor 206 may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor 206 may be configured to execute one or more computer-readable program instructions, such as program instructions to carry out any of the functions described in this description.

In an embodiment, the processor 206 may be configured to perform various steps for adjusting the audio parameters for the user. At first, the processor 206 may perform a hearing test of the user. The hearing test may be performed by playing an audio. The audio including various audio frequencies may be played on an audio device. In one case, the audio may be played on the user device 106. The audio may be a sample tone, music, or spoken words.

Figure 3:
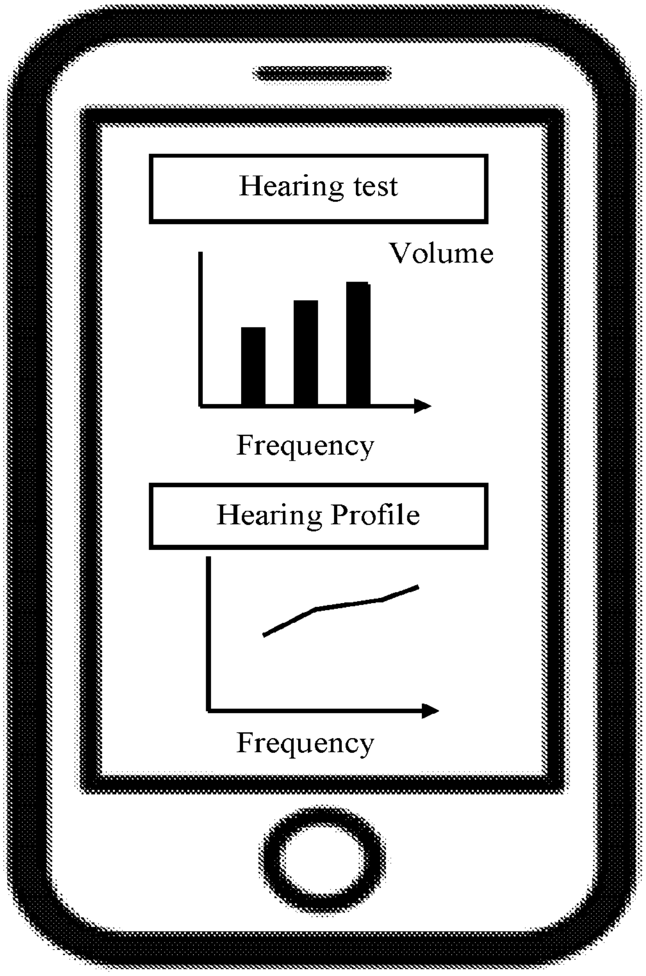
FIG. 3 illustrates a user device 106 showing a hearing test and a hearing profile of the user, according to an embodiment.

For example, as shown in FIG. 3, the hearing test may be performed on the user device 106 i.e., a smart phone. Further, details of the hearing test may be displayed on the user device 106 which depicts a relationship between the volume of the audio and the frequency of the audio. Examples of the user device 106 may include, but not limited to, smart phones, mobile phones, desktop computer, or tablet. It should be noted that the user may have impaired hearing. The impaired hearing may refer to hearing loss suffered by the user. Alternatively, the hearing test may be performed through audio applications which are well known in the art.

In one embodiment, the user may listen to the audio. While listening to the audio, the user may provide an auditory response towards the audio. In one case, the auditory response may be provided by the user using the user device 106. The auditory response may include information, such as increased/reduced hearing in a left ear.

In one embodiment, the processor 206 may generate a hearing profile of the user. The hearing profile may be generated based on one or more results of the hearing test. The one or more results may correspond to a hearing ability of the user. It should be noted that the results of the hearing test may be utilized to regulate the audio parameters for both ears of the user. For example, the one or more results may include the user not being able to hear properly from his left ear, and the user may require balancing volume or frequency of the audio, for both of his ears.

Further, the hearing profile may be defined as a hearing adjustment profile that may include a spectrum of the audio divided into a plurality of audio frequency bands. Each frequency band of the audio may be associated with the user defined playback amplitudes of the audio. It should be noted that the playback amplitudes may be defined by the user while listening to the audio. For example, the user may require low amplitude in a right ear and/or the user may require high volume in a left ear. In one case, the processor 206 may display the hearing profile of the user on the user device 106. FIG. 3 shows the hearing profile of the user, displayed on the user device 106 i.e., a smart phone.

Successive to generating the hearing profile, the processor 206 may adjust a playing speed of the audio. The playing speed of the audio may be adjusted based on the hearing profile. In one case, the processor 206 may adjust various other audio parameters such as, but not limited to, amplitude of the audio, frequency of the audio, and/or volume of the audio. For example, the user may have an impaired hearing and the user may want to understand the audio properly. Then, the processor 206 may adjust the volume of the audio by increasing volume of the audio and also decreasing speed of the audio, so that the user may hear the audio properly. In some cases, the processor 206 may also increase the speed of the audio and in certain cases the processor 206 may modulate the audio by increasing or decreasing the speed of the audio.

In another scenario, if the hearing profile states that the user needs additional volume in the left ear, the processor 206 may adjust the volume of the audio accordingly. Similarly, if the hearing profile of the user states that the user needs a frequency adjustment (i.e., less bass or more bass) for the audio in the right ear, the processor 206 may adjust frequency for the right ear accordingly. In another example, if the hearing profile of the user states that the user needs volume or frequency balance between the ears, then the processor may adjust the audio parameters accordingly for the user.

In one embodiment, a device may be configured to adjust the audio parameters for the user. The device may perform a hearing test of the user. The hearing test may be performed by playing an audio and capturing an auditory response of the user towards the audio. Based on results of the hearing test, a hearing profile of the user may be generated. Thereafter, the device may adjust a playing speed of the audio based on the hearing profile, thereby adjusting the audio parameters for the user. In an embodiment, the device may adjust various audio parameters such as amplitude of the audio, frequency of the audio, and volume of the audio, based on the hearing profile. In one case, the device may refer to the user device 106 or a separate audio device.

Figure 4:
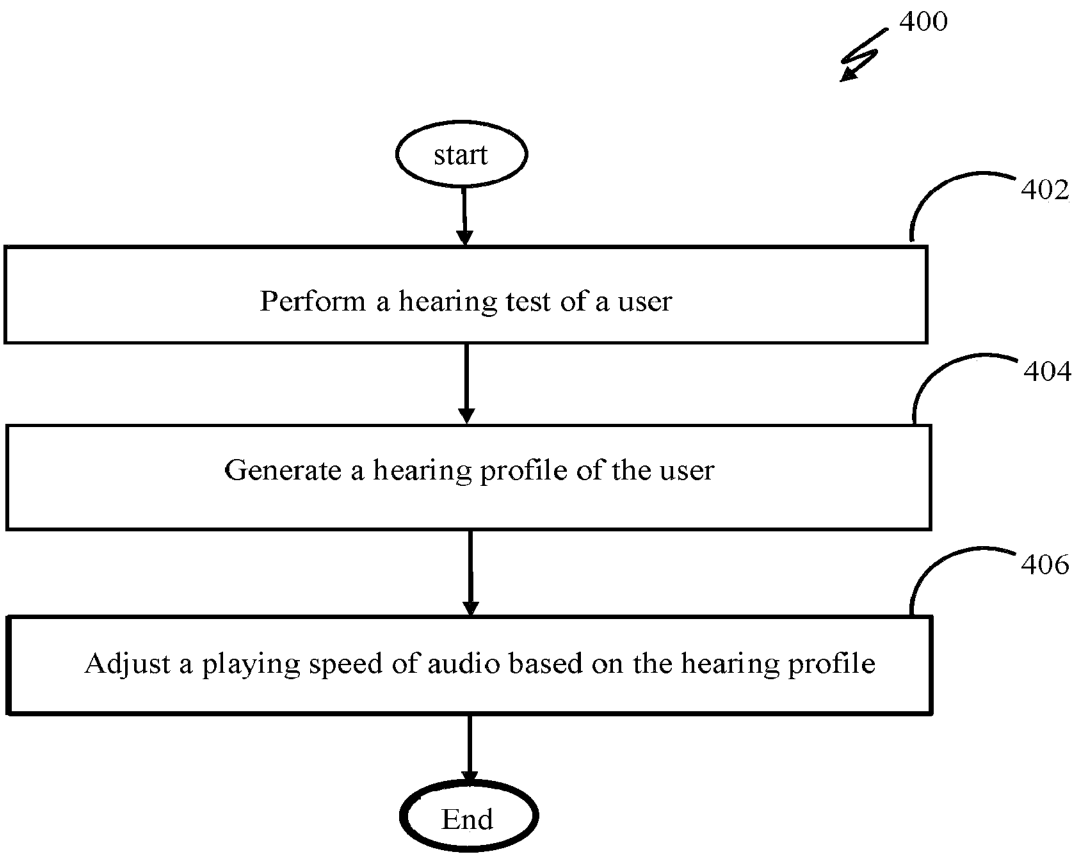
FIG. 4 illustrates a flowchart 400 showing a method for adjusting the audio parameters for the user, according to an embodiment.

FIG. 4 illustrates a flowchart 400 of a method for adjusting the audio parameters for the user, according to an embodiment. FIG. 4 comprises a t10wchart 400 that is explained in conjunction with the elements disclosed in Figures explained above.

The flowchart 400 of FIG. 4 shows the architecture, functionality, and operation for adjusting the audio parameters for the user. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 400 starts at the step 402 and proceeds to step 406.

At step 402, a hearing test of the user may be performed, by the processor 206. The user may be suffering from impaired hearing. The hearing test may include playing an audio for the user. An auditory response of the user may be received, towards the audio. The processor 206 may capture the auditory response.

At step 404, a hearing profile of the user may be generated. The hearing profile may be generated based at least on one or more results of the hearing test. The one or more results of the hearing test may correspond to a hearing ability of the user. Further, the hearing profile may include a spectrum of the audio divided into a plurality of audio frequency bands and each frequency band being associated with user defined playback amplitudes of the audio.

At step 406, a playing speed of the audio may be adjusted. The playing speed may be adjusted based on the hearing profile, and thereby adjusting the audio parameters for the user. Based on the hearing profile, the processor 206 may further adjust the audio parameters such as volume of the audio, frequency of the audio, and amplitude of the audio, in an embodiment.

Figure 5:
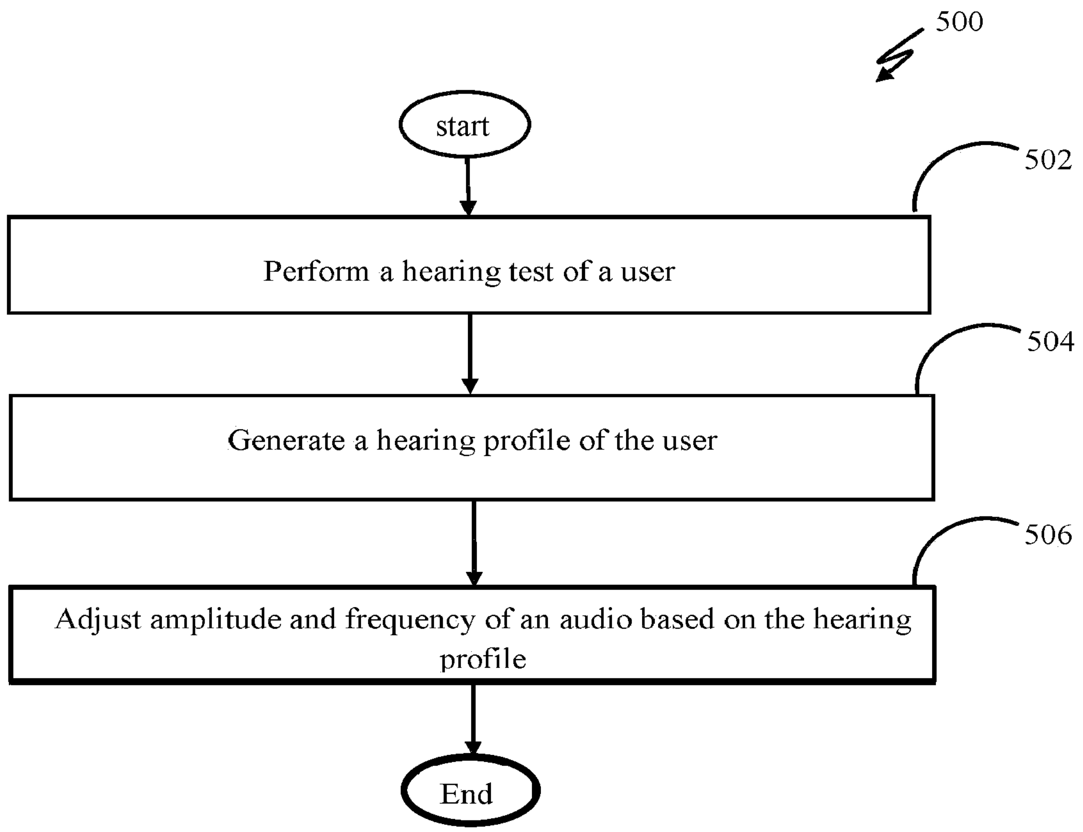
FIG. 5 illustrates a flowchart 500 showing a method for adjusting amplitude and frequency of an audio for the user, according to an embodiment.

FIG. 5 illustrates a flowchart 500 of a method for adjusting amplitude of an audio and a frequency of the audio for the user, according to an embodiment. FIG. 5 comprises a flowchart 500 that is explained in conjunction with the elements disclosed in Figures explained above.

The flowchart 500 of FIG. 5 shows the architecture, functionality, and operation for adjusting the amplitude of the audio and the frequency of the audio for the user. In this regard, each block may represent a module, segment, or portion of code, which comprises one or more executable instructions for implementing the specified logical function (s) It should also be noted that in some alternative implementations, the functions noted in the blocks may occur out of the order noted in the drawings. For example, two blocks shown in succession in FIG. 5 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 500 starts at the step 502 and proceeds to step 506.

At step 502, a hearing test of the user may be performed, by the processor 206. The user may be suffering from impaired hearing. The hearing test may include playing an audio for the user. An auditory response of the user may be received, towards the audio. The processor 206 may capture the auditory response.

At step 504, a hearing profile of the user may be generated. The hearing profile may be generated based at least on one or more results of the hearing test. The one or more results of the hearing test may correspond to a hearing ability of the user. Further, the hearing profile may include a spectrum of the audio divided into a plurality of audio frequency bands and each frequency band being associated with user defined playback amplitudes of the audio.

At step 506, amplitude and frequency of the audio may be adjusted. The amplitude of the audio and the frequency of the audio may be adjusted based on the hearing profile. Based on the hearing profile, the processor 206 may further adjust the audio parameters such as volume of the audio, in an embodiment, Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Head-Only Memories (CD-ROMs), and magnetooptical disks, semiconductor memories, such as HOMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

Figure 6:
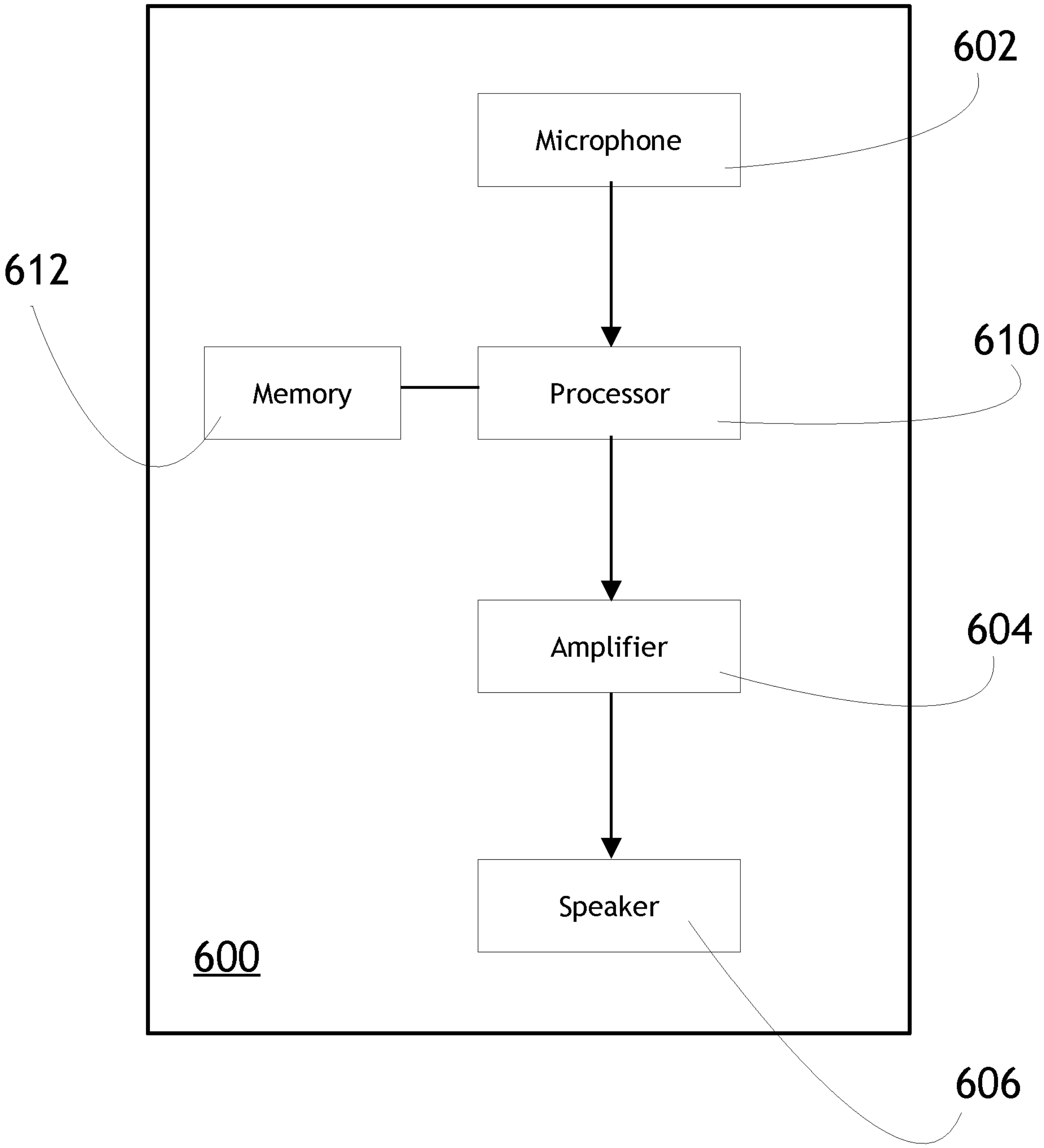
FIG. 6 illustrates a block diagram for a hearing aid.

The invention may be embodied in a hearing aid system 600, as shown in FIG. 6. While analog hearing aids have a microphone 602, amplifier 604, and speaker 606, digital hearing aids add a processor 610 with a memory 612. This processor 610 may be programmed to a set audio profile. Modern digital hearing aids currently will receive audio through the microphone 602 and the processor 610 will digitize the audio before adjusting it according to a provided algorithm to discretely amplify desired sounds while diminishing background noise and other unwanted sounds. The use of the present invention adapts the received ambient sound according to the determined sound profile of the user, stored in the memory 612 of the processor 610. As the received sound is digitized, further alteration may be accomplished according to the teachings of this invention. Discrete digital signals may be merely amplified or may have their frequencies or playback speeds altered to match a preferred hearing range before being run through an amplifier and speaker. With greater flexibility regarding the matching of a preferred audio profile, a better hearing aid may be produced for the consumer.

Although the present invention has been described with reference to preferred embodiments, numerous modifications and variations can be made and still the result will come within the scope of the invention. For instance, other devices such as headphones and audio systems and speakers may be adapted to the practice of the invention. The described embodiments are to be considered in all respects only as illustrative and not restrictive. No limitation with respect to the specific embodiments disclosed herein is intended or should be inferred. Therefore, the scope of the invention is indicated by the appended claims rather than by the foregoing description. All changes which come within the meaning and range of equivalency of the claims are to be embraced within their scope.

What is claimed is:

1. A method for adjusting audio parameters for a user, the method comprising:

performing, by a processor, a hearing test of the user, wherein the hearing test comprises playing an audio and capturing an auditory response of the user towards the audio;

generating, by the processor, a hearing profile of the user, based on one or more results of the hearing test;

uploading the hearing profile of the user into a hearing aid, said hearing aid further comprising a microphone, a speaker, a memory, and a hearing aid processor;

receiving ambient audio from the hearing aid microphone;

digitizing the ambient audio; and, adjusting, by the hearing aid processor, an amplitude of the ambient audio, a speed of the ambient audio and a frequency of the ambient audio based on the hearing profile, thereby adjusting audio parameters of the ambient audio for the user.

2. The method of claim 1, wherein the user suffers from impaired hearing.

3. The method of claim 1, wherein the one or more results of the hearing test corresponds to a hearing ability of the user.

4. The method of claim 1, wherein the hearing profile comprises a spectrum of the audio divided into a plurality of audio frequency bands and each frequency band being associated with user defined playback amplitudes of the audio.

5. A method for adjusting audio parameters for a user, the method comprising:

performing, by a processor, a hearing test of the user, wherein the hearing test comprises playing an audio and capturing an auditory response of the user towards the audio;

generating, by the processor, a hearing profile of the user, based on one or more results of the hearing test;

uploading the hearing profile of the user into a hearing aid, said hearing aid further comprising a microphone, a speaker, a memory, and a hearing aid processor;

receiving ambient audio from the hearing aid microphone;

digitizing the ambient audio; and, adjusting, by the hearing aid processor at least one audio parameter of the ambient audio, the at least one audio parameter being selected from the set of audio parameters consisting of: a speed of the ambient audio and a frequency of the ambient audio based on the hearing profile, thereby adjusting audio parameters of the ambient audio for the user.

6. The method of claim 5, wherein the user suffers from impaired hearing.

7. The method of claim 5, wherein the one or more results of the hearing test corresponds to a hearing ability of the user.

8. The method of claim 5, wherein the hearing profile comprises a spectrum of the audio divided into a plurality of audio frequency bands and each frequency band being associated with user defined playback amplitudes of the audio.

* * * * *